(12) United States Patent  
Waszak

(10) Patent No.: US 7,693,386 B2
(45) Date of Patent: Apr. 6, 2010

(54) PARALLEL PATH CABLE ROUTING SYSTEM

(75) Inventor: Dennis J. Waszak, Wheaton, IL (US)

(73) Assignee: Panduit Corp., Tinley Park, IL (US)

( * ) Notice: Subject to any disclaimer, the term of this patent is extended or adjusted under 35 U.S.C. 154(b) by 90 days.

(21) Appl. No.: 11/421,346

(22) Filed: May 31, 2006

(65) Prior Publication Data

US 2006/0269210 A1 Nov. 30, 2006

Related U.S. Application Data

(60) Provisional application No. 60/685,939, filed on May 31, 2005.

(51) Int. Cl.
G02B 6/00 (2006.01)
(52) U.S. Cl. .................... 385/135; 385/134; 211/26; 361/825; 361/826; 361/827
(58) Field of Classification Search .......... 385/134–135
See application file for complete search history.

(56) References Cited

U.S. PATENT DOCUMENTS

| 2,834,622 | A | * | 5/1958 | Reeves ..................... 403/335 |
| 3,001,001 | A | | 9/1961 | Bibb |
| 3,471,629 | A | | 10/1969 | O'Leary |
| 3,680,817 | A | | 8/1972 | Gogan |
| 4,163,572 | A | | 8/1979 | Benscoter |
| 4,366,341 | A | | 12/1982 | Van Riet |
| 4,860,168 | A | | 8/1989 | Wiljanen et al. |
| 4,926,009 | A | | 5/1990 | Van Leeuwen |
| 5,067,678 | A | | 11/1991 | Henneberger et al. |
| 5,142,606 | A | | 8/1992 | Carney et al. |
| 5,316,243 | A | | 5/1994 | Henneberger |
| 5,399,814 | A | | 3/1995 | Staber et al. |
| 5,465,929 | A | * | 11/1995 | Dooley ..................... 248/68.1 |
| 5,752,781 | A | | 5/1998 | Haataja et al. |

(Continued)

FOREIGN PATENT DOCUMENTS

FR 2220904 A * 11/1974

OTHER PUBLICATIONS

Webster's dictionary, definition of "trough".*

(Continued)

Primary Examiner—Frank G Font
Assistant Examiner—Erin D Chiem
(74) Attorney, Agent, or Firm—Robert A. McCann; Christopher S. Clancy; Aimee E. McVady

(57) ABSTRACT

A parallel path cable routing system that incorporates parallel paths into a single system. The parallel path cable routing system includes a first cable trough having a cable pathway and a second cable trough having a cable pathway. The first cable trough is parallel to the second cable trough. The parallel path cable routing system also includes a single component having a cable pathway that is coupled to both the first and second cable troughs. The single component connects the first cable trough pathway to the second cable trough pathway to allow the cables to run from the first cable trough to the second cable trough thereby transitioning the cables in the parallel path cable routing system.

9 Claims, 18 Drawing Sheets

U.S. PATENT DOCUMENTS

| | | |
|---|---|---|
| 5,872,336 A | 2/1999 | Long |
| 5,917,982 A | 6/1999 | Vargas et al. |
| 5,923,753 A | 7/1999 | Haataja et al. |
| 5,937,131 A | 8/1999 | Haataja et al. |
| 6,192,181 B1 | 2/2001 | Haataja et al. |
| 6,284,975 B1 * | 9/2001 | McCord et al. ........... 174/71 R |
| 6,323,421 B1 | 11/2001 | Pawson et al. |
| 6,344,611 B2 | 2/2002 | Ewer et al. |
| 6,429,376 B1 | 8/2002 | Mendoza |
| 6,448,495 B1 | 9/2002 | Mattei et al. |
| 6,468,112 B1 * | 10/2002 | Follingstad et al. ......... 439/719 |
| 6,522,823 B1 | 2/2003 | Wentworth et al. |
| 6,535,683 B1 | 3/2003 | Johnson et al. |
| 6,546,181 B1 | 4/2003 | Adapathya et al. |
| 6,547,192 B2 * | 4/2003 | Rinderer et al. ............... 248/49 |
| 6,583,356 B2 * | 6/2003 | Arthur et al. ................. 174/659 |
| 6,597,854 B2 | 7/2003 | Haataja et al. |
| 6,625,373 B1 | 9/2003 | Wentworth et al. |
| 6,631,875 B1 | 10/2003 | Kampf et al. |
| 6,634,605 B2 * | 10/2003 | Bernard et al. ............. 248/68.1 |
| 6,708,918 B2 | 3/2004 | Watts et al. |
| 6,724,970 B2 | 4/2004 | Adapathya et al. |
| 6,865,851 B2 | 3/2005 | Stempinski |
| 2002/0036095 A1 | 3/2002 | Ewer et al. |
| 2002/0094184 A1 | 7/2002 | Mattei et al. |

OTHER PUBLICATIONS

"Panduit Network Connectivity Solutions: FiberRunner Routing Systems and Fiber-Duct Routing System," not dated, pp. C3.1-C3.52, Panduit Corp.

* cited by examiner

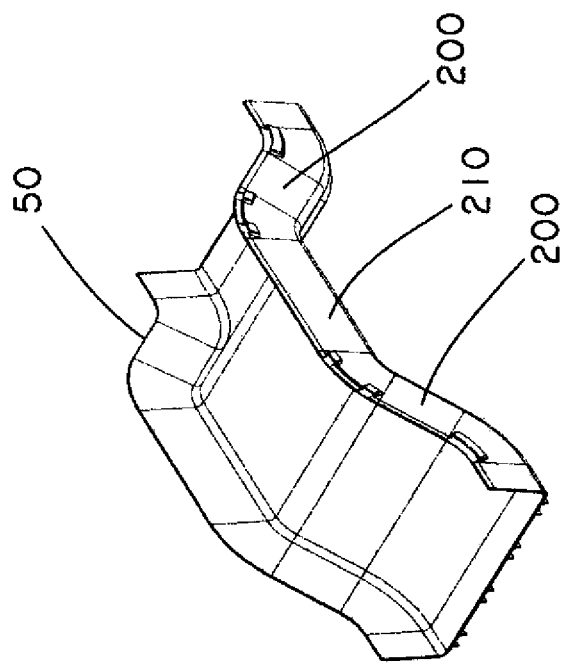
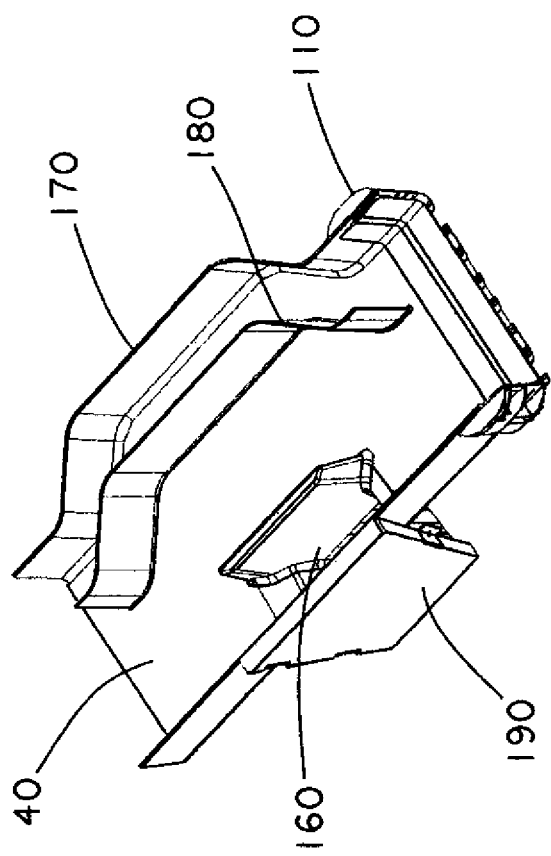

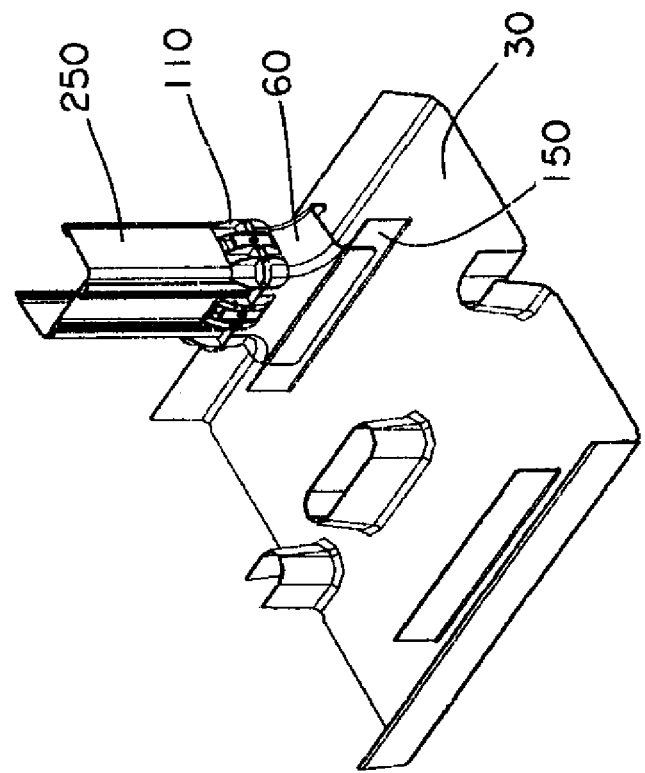
FIG.15
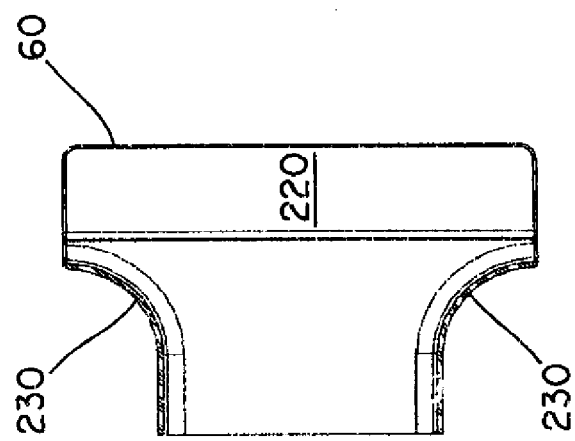
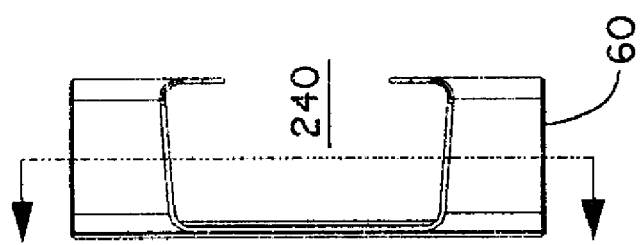
FIG.14

PARALLEL PATH CABLE ROUTING SYSTEM

RELATED APPLICATIONS

This application claims the benefit of U.S. Provisional Application 60/685,939, filed May 31, 2005, the entirety of the previously filed application being incorporated herein by reference.

BACKGROUND

1. Field of the Invention

The present invention relates to the field of duct-type cable routing systems. More specifically, the invention relates to the use of parallel duct-type routing systems.

2. Background

This application is directed to a parallel path cable routing system. Routing systems have become very popular in recent years to route, protect, and conceal cabling, such as data, audio, video, fiber optic, and/or power cabling. Such systems allow custom installation and can be provided on external surfaces and/or be suspended from threaded rod-type supports, allowing ready access for reconfiguration, repair, or installation of additional equipment. Such systems may typically include various sections of duct, including straight sections (sometimes also referred to as cable troughs) and various fittings, such as 90° elbow fittings, 45° elbow fittings, T-fittings, four-way intersection (x) fittings, and the like, respective ones of which are affixed together by duct couplers to cumulatively form a duct system.

One example in which cable management is necessary is the routing of optical fibers from one piece of optical fiber equipment to another. For example, in a telecommunications facility, optical fiber cables may be routed between fiber distribution equipment and optical line terminating equipment. In buildings and other structures that carry such equipment, the cable routing can take place in any number of ways to route cables from one location to another, such as on supports suspended from a facility's ceiling.

When routing optical fibers or other cabling, it is desirable that any routing system will be readily modifiable and adaptable to changes in equipment and/or routing needs. Accordingly, a routing system that could not be readily adapted to changes in a customer's needs and/or that requires a high capital outlay is not practical. Namely, if routing paths, once established, are forever fixed, the system cannot adapt. Moreover, if maintaining a large inventory of different spare parts is required, the system is also not practical. Therefore, it is often advantageous to have a system with a high degree of modularity, which provides interchangeable parts or parts with similar dimensions. Some common dimensions for cable routing system components can include 4-inch wide by 4-inch high, 6-inch wide by 4-inch high, and 12-inch wide by 4-inch high cross-sectional dimensions. It is also desirable that the routing system manages cabling in high density areas. Thus, it would be advantageous to have a system that incorporates various paths in a single system to double the cable capacity of the single system.

Moreover, cable routing systems should protect the cables, especially optical fibers, from damage. In the use of optical fibers, for proper operation, the fibers should not be bent beyond a minimum radius of curvature. For example, some systems require that optical fibers should not be bent in a radius of less than 1.5 inches, and other systems require that optical fibers should not be bent in a radius of less than 2 inches. Other examples are possible as well.

U.S. Pat. Nos. 5,067,678 and 5,316,243 (both assigned to ADC Telecommunications. Inc.) provide examples and descriptions of the general background and environment of cable routing systems, and the specifications of these issued patents are incorporated herein by reference as though set forth here in full.

SUMMARY

In one embodiment, a parallel path cable routing system includes a first cable trough having a cable pathway and a second cable trough having a cable pathway. The first cable trough is parallel to the second cable trough. The parallel path cable routing system also includes at least one single component having a cable pathway coupled to both the first and second cable troughs. The single component connects the first cable trough pathway to the second cable trough pathway to allow one or more cables to run from the first cable trough to the second cable trough thereby transitioning the cables in the parallel path cable routing system.

In another embodiment, a parallel path cable routing system includes a first cable trough and a second cable trough. The first cable trough is parallel to the second cable trough. The parallel path cable routing system also includes a plurality of interchangeable components coupled to both the first and second cable troughs. The interchangeable components connect the first cable trough to the second cable trough allowing one or more cables to run from the first cable trough to the second cable trough thereby transitioning the cables in the parallel path cable routing system.

In another embodiment, a parallel path cable routing system includes parallel cable troughs. The parallel path cable routing system also includes at least one fitting component that is coupled to the cable troughs. The fitting component includes a projection for managing cables in the parallel path cable routing system. The fitting component connects the cable troughs allowing one or more cables to run between the cable troughs thereby transitioning the cables in the parallel path cable routing system.

BRIEF DESCRIPTION OF THE DRAWINGS

Embodiments of the present invention are described herein with reference to the drawings, in which:

FIG. 8 depicts a top isometric view of the example bump-out vertical tee connected to an embodiment of the coupler;

FIG. 9 depicts a top isometric view of an example bump-up transition;

FIG. 14 depicts a top view and a cross-sectional view of the example multi-tier vertical transition;

FIG. 15 depicts a top isometric view of the example multi-tier vertical transition engaging the IFC pass-through component;

DETAILED DESCRIPTION

1. Overview of a Parallel Path Cable Routing System (FIG. 1)

Figure 1:
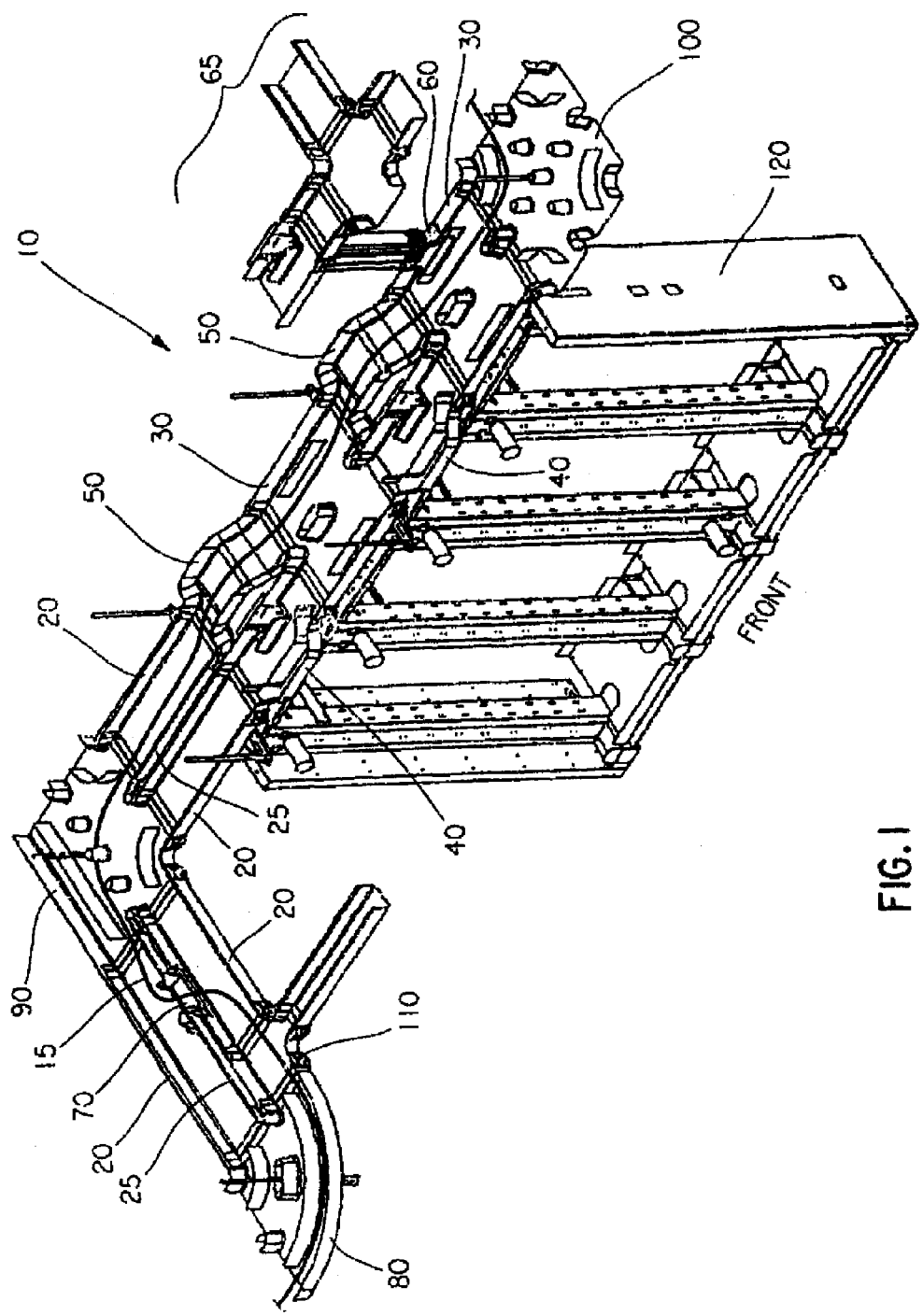
FIG. 1 depicts a parallel path cable routing system.

FIG. 1 depicts a parallel path cable routing system 10, which can be a high capacity fiber routing system. Generally, as shown in FIG. 1, the parallel path cable routing system can incorporate two parallel paths of cable routing channel into a single system. In one embodiment (the embodiment described in this specification), each parallel path includes 12-inch wide by 4-inch high cable troughs 20, which can be separated by a gap 25. Other dimensions and embodiments are possible as well.

As shown in FIG. 1, the parallel path cable routing system 10 can also include other components designed to manage parallel path cable routing in the example 12-inch wide cable troughs 20. These components can include an interfacility cable ("IFC") pass-through component 30, a bump-out vertical tee 40, a bump-up transition 50, a multi-tier vertical transition 60 (which can transition cable into an additional tier 65 of the cable routing system), a channel cross-over 70, a dual right angle component 80, a dual horizontal tee 90, and a dual four way cross 100. These components are discussed in more detail below.

The various components of the parallel path cable routing system 10 can be affixed together by duct couplers, such as the example duct coupler 110 referenced in FIG. 1. U.S. Pat. Nos. 6,450,458; 6,523,791; 6,559,378; and 6,634,605, and U.S. patent application Ser. No. 10/808,974 (filed Mar. 25, 2004 and entitled "Releasable Barb Assembly"), provide specific examples and descriptions of the general background of cable duct couplers and other cable duct fittings, and the entirety of these patents and application are incorporated herein by reference as though set forth here in full.

FIG. 1 depicts the parallel path cable routing system 10 over a four-bay high-density distribution frame 120. The distribution frame 120 is one example of the many types of devices that the cable routing system can route cable 15 to and from. In this embodiment, the distribution frame 120 is a rack and cable management system for distribution of fiber optic cables 15. The distribution frame 120 can include various enclosures, such as a fiber optic connector enclosure and fiber optic rack mount splice enclosure, for example (neither of which are shown in FIG. 1).

The parallel path cable routing system 10 can aid in cable management because, as discussed in more detail below, it can allow for cable (such as fiber optic jumpers, for example) and IFCs to smoothly transition into or out of a device, such as the high-density distribution frame 120, The parallel path cable routing system provides cable routing without blocking access to the top of the rack. In addition, the parallel path approach can increase the cable capacity of a single system by tying two systems together. For example, the system depicted in FIG. 1 includes two parallel 12-inch wide by 4-inch high cable routing systems, which doubles the cable capacity of a single 12-inch wide system. As also discussed below, the parallel path approach also advantageously allows for easy transitioning of cable from one of the parallel paths to the other of the parallel paths.

The parallel path approach can also promote modularity of cable management systems. The use of 12-inch wide by 4-inch high cable troughs 20 (and corresponding components) can allow the use of some existing components with the other components and directional fittings depicted in the parallel path cable routing system 10 of FIG. 1. As a particular example, existing 12-inch wide by 4-inch high cable troughs 20, duct couplers 110, and other components can be used with the system described in this specification. Such modularity can conserve time and resources for both a facility employing the parallel path cable routing system 10 and the manufacturer of components for such a system. For example, a facility can minimize the number of spare parts it needs to store, tools it needs for installation, and training for its employees; a manufacturer of cable routing systems and components can minimize the number of parts it has to fabricate (and the tooling of its plants), training for its employees, etc. in a modular system.

Several other advantages of the parallel path cable routing system 10 are also evident. For example, because the parallel path cable routing system 10 achieves the needed capacity through parallel runs of cable troughs, the system components such as the cable troughs, 20 and the couplers 110, are easier to handle because they are smaller. For instance, in the embodiments of the parallel path cable routing system 10 that utilize 12-inch wide by 4-inch high components, it can be easier to handle two separate 12-inch wide by 4-inch high components than one 24-inch wide by 4-inch high component. Moreover, the gap 25 of the parallel path cable routing system 10 (as well as other gaps or openings in the various components of the system) can also afford several advantages, such as allowing overhead access, allowing light through the cable routing system, allowing cable drops through the cable runs, etc.

Other examples and advantages of the parallel path cable routing system 10 are possible as well.

2. IFC Pass-Through Component (FIGS. 2-5)

Figure 3:
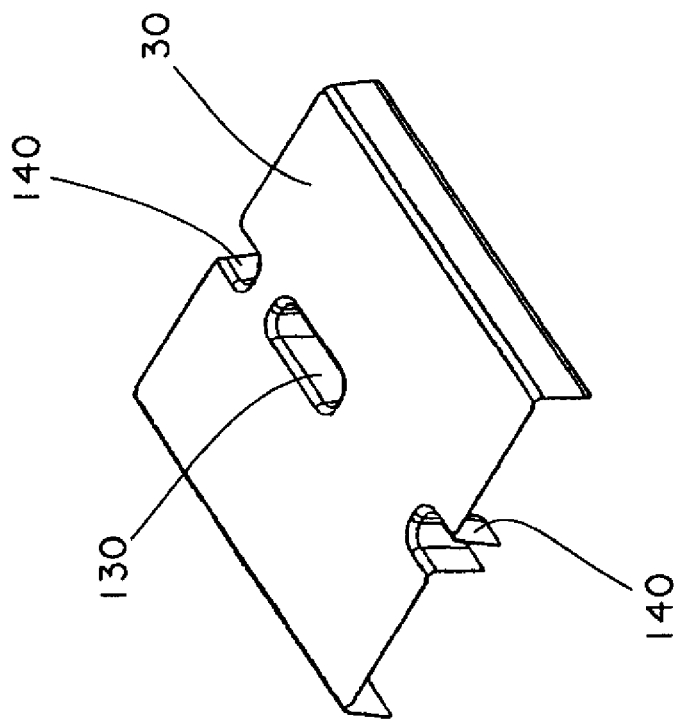
FIG. 3 depicts a bottom isometric view of the example IFC pass-through component.
Figure 2:
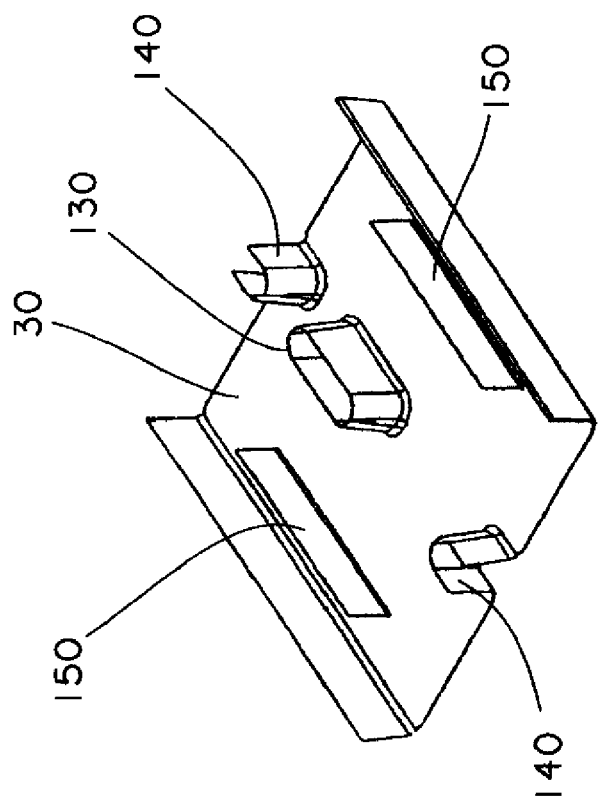
FIG. 2 depicts a top isometric view of an example IFC pass-through component.
Figure 5:
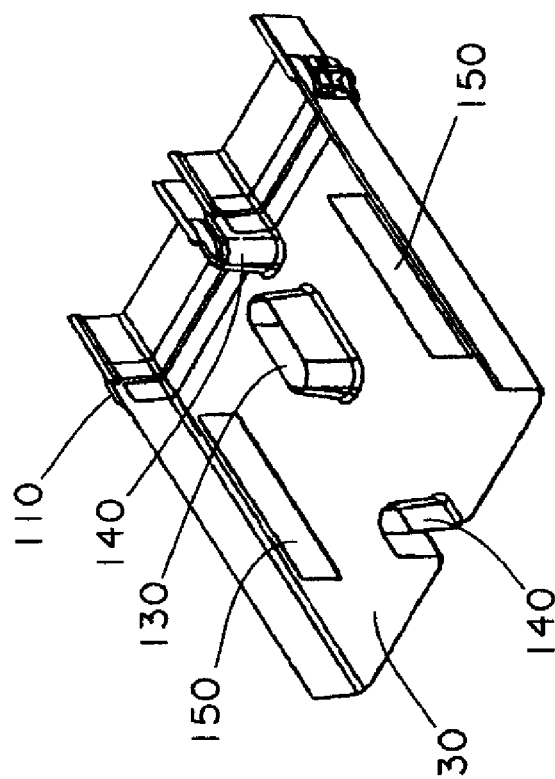
FIG. 5 depicts a top isometric view of the example IFC pass-through component connected to an embodiment of a coupler.
Figure 4:
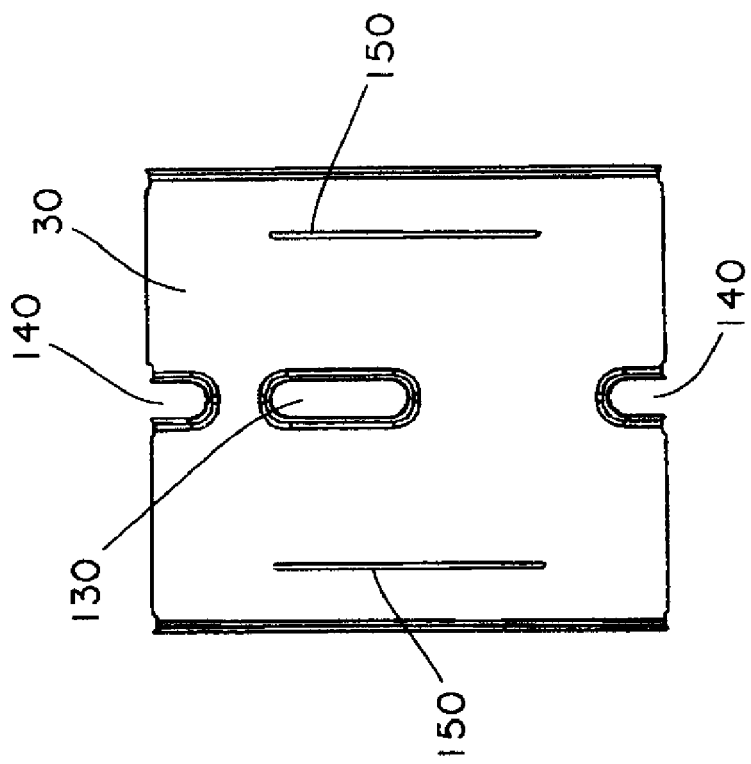
FIG. 4 depicts a top view of the example IFC pass-through component.

FIGS. 2-5 depict an embodiment of the IFC pass-through component 30. FIG. 2 depicts a top isometric view of the example IFC pass-through component 30; FIG. 3 depicts a bottom isometric view of the example IFC pass-through component 30; FIG. 4 depicts a top view of the example IFC pass-through component 30; and FIG. 5 depicts a top isometric view of the example IFC pass-through component 30 connected to an embodiment of the coupler 110.

The IFC pass-through component 30 allows two parallel paths of cable troughs 20 or cable management components to be linked into one single fitting, allowing cables to run from one parallel path to the other parallel path. The IFC pass-through component 30 can also include one or more openings, such as one or more close-walled pass-through openings 130 and one or more open-walled pass-through openings 140. The one or more open-walled pass-through openings 140 can form a close-walled pass-though opening or a gap, for example, depending on whether or if the component 30 is connected to another cable routing component, cable trough, etc.

The openings 130 and 140 (especially the opening 130) can allow for IFCs to pass through the IFC pass-through component 30 and smoothly transition into a distribution frame, such as the distribution frame 120 depicted in FIG. 1. In one embodiment, the parallel path cable routing system 10 can be located directly above the distribution frame 120, and cable can be dropped through the opening 130 in the IFC pass-through component 30. Such an arrangement can conserve space within a facility, such as by avoiding the need to route cable over the side of a component, for example. The openings 130 and 140 can also function to space out and separate the parallel routes of cable.

The IFC pass-through component 30 can also include one or more divider walls 150, which can provide separation for cables routed in the fitting (and not routed through the openings 130 or 140). The one or more divider walls 150 can also provide a surface to which the multi-tier vertical transition 60 can attach, as shown in FIG. 1 and as discussed in more detail below.

As shown in FIG. 4, some embodiments of the IFC pass-through component 30 can have a length of 30 inches. Further, some embodiments of the IFC pass-through component 30 can have a width that corresponds to parallel 12-inch wide by 4-inch high cable routing paths with the gap 25 (and can thereby promote the modularity of the parallel path cable routing system 10). Other lengths and dimensions are possible as well.

As shown in FIG. 5, either side of the IFC pass-through component 30 can connect to the coupler 110, and thereby connect to other cable duct components (as partially shown on FIG. 5). Such components can include the bump-out vertical tee 40, the bump-up transition 50, and the dual four-way cross 100, as shown in FIG. 1, as well as other cable duct components and cable troughs. Some embodiments of the coupler 110 are 12-inches wide by 4-inches high, although other dimensions are possible as well.

3. Bump-Out Vertical Tee (FIG. 6-8)

Figure 7:
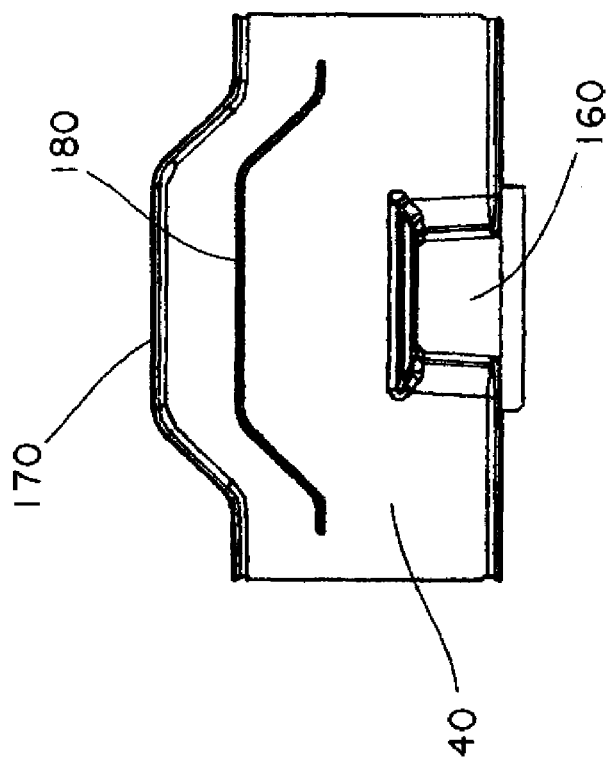
FIG. 7 depicts a top view of the example bump-out vertical tee.
Figure 6:
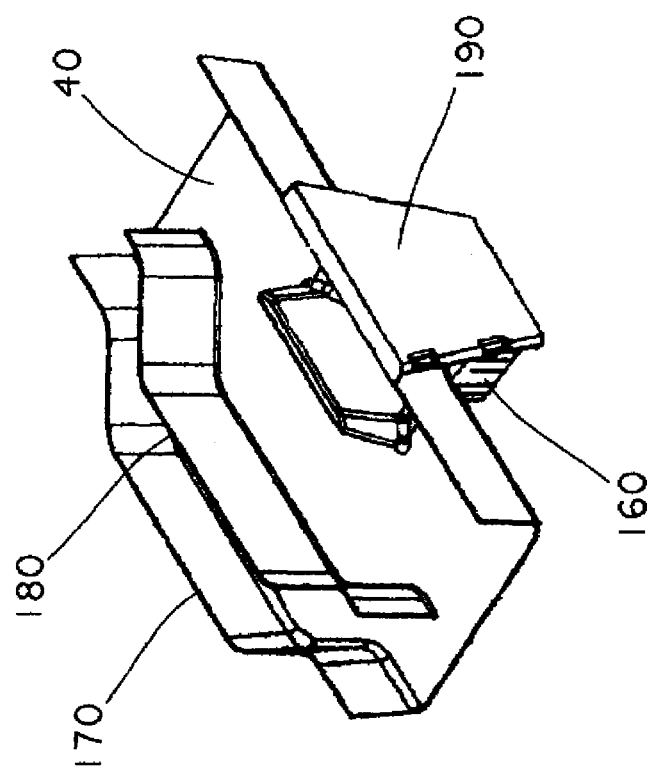
FIG. 6 depicts a top isometric view of an example bump-out vertical tee.
Figure 10:
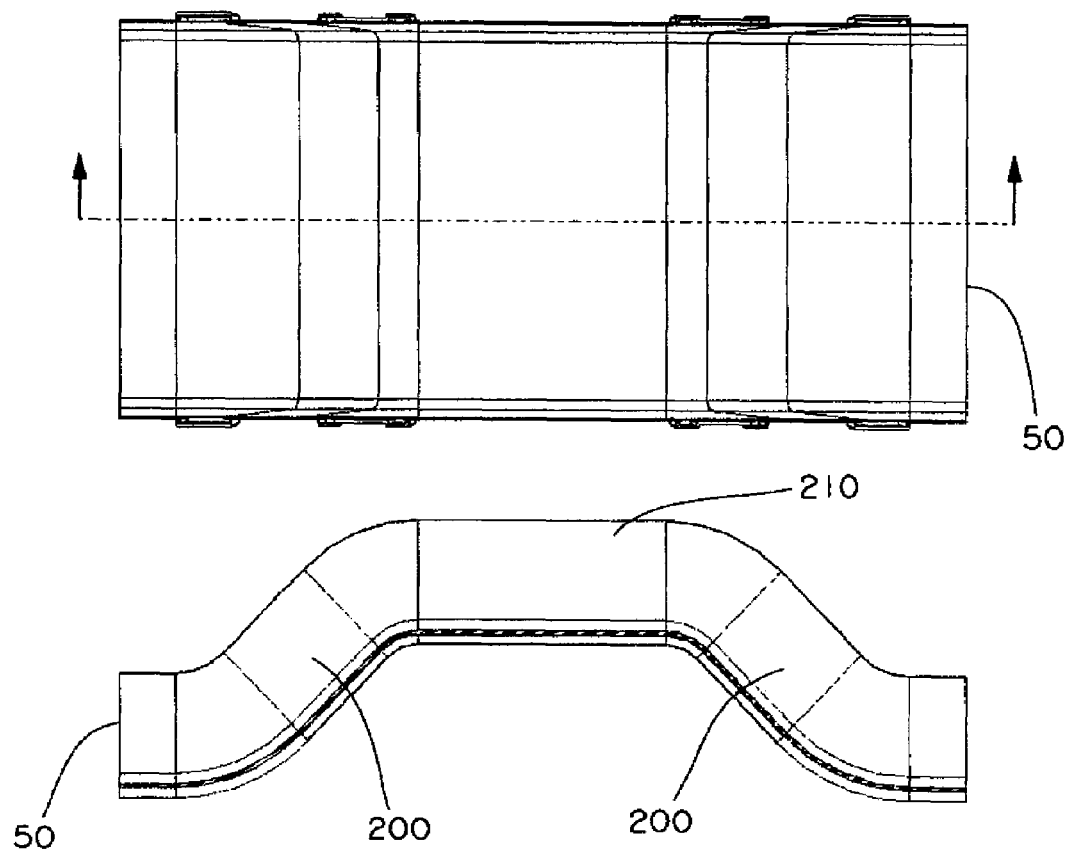
FIGS. 10a and 10b depict a top view and a cross-sectional view of the example bump-up transition, respectively.

FIGS. 6-8 depict an embodiment of the bump-out vertical tee 40. FIG. 6 depicts a top isometric view of the example bump-out vertical tee 40; FIG. 7 depicts a top view of the example bump-out vertical tee 40; and FIG. 8 depicts a top isometric view of the example bump-out vertical tee 40 connected to an embodiment of the coupler 110.

The bump-out vertical tee 40 can include a vertical drop opening 160 to allow a vertical cable drop from the vertical tee 40 to a distribution frame, such as the distribution frame 120 depicted in FIG. 1. As shown in FIG. 7, in one embodiment, the opening 160 can be 6-inches by 4-inches, although other dimensions are possible as well. Cable run in the parallel path cable routing system 10 can drop down through the opening 160 to distribution equipment.

The bump-out vertical tee 40 can also include a bump out section 170. The bump)-out section 170 can ensure that a particular bump-out vertical tee 40 retains the necessary capacity for cable routing despite the vertical drop opening 160. For instance. FIG. 7 depicts a 4-inch bump-out distance that corresponds to the 4-inch wide vertical drop opening 160. More particularly, in a 12-inch wide by 4-inch high cable routing path, the bump-out vertical tee 40 can include a 4-inch wide vertical drop opening 160 within the 12-inch width of the fitting profile, and also include a 4-inch wide bump-out section 170 that allows the tee 40 to still maintain the desired cable capacity. Other dimensions are possible as well. The bump-out vertical tee 40 can also include a divider wall 180 that can ensure that the cable routed through the tee 40 will conform to the bump-out section 170.

The bump-out vertical tee 40 can also include an access means 190, which can allow access to the cable routed through the vertical drop opening 160. The access means 190 can also close to cover or enclose the cables routed through the vertical drop opening 160. In some embodiments, and as depicted in FIGS. 6 and 8, the access means 190 can comprise a hinged door that can swing open to allow cable access and that can swing closed to cover or enclose the cables when no access is needed. Other embodiments are possible as well.

As shown in FIG. 7, some embodiments of the bump-out vertical tee 40 can have a length of 30 inches. Further, some embodiments of the bump-out vertical tee 40 can have a width (at the ends of the tee) that corresponds to a 12-inch wide by 4-inch high cable routing path (and can thereby promote the modularity of the parallel path cable routing system 10). Other lengths and dimensions are possible as well.

As shown in FIG. 8, either side of the bump-out vertical tee 40 can connect to a coupler 110, and thereby connect to other cable duct components. Such components can include the IFC pass-through component 30 and a section of the cable trough 20, as shown in FIG. 1, as well as other cable duct components. Some embodiments of the coupler 110 are 12-inches wide by 4-inches highs although other dimensions are possible as well.

4. Bump-Up Transition (FIGS. 9-12)

Figure 11:
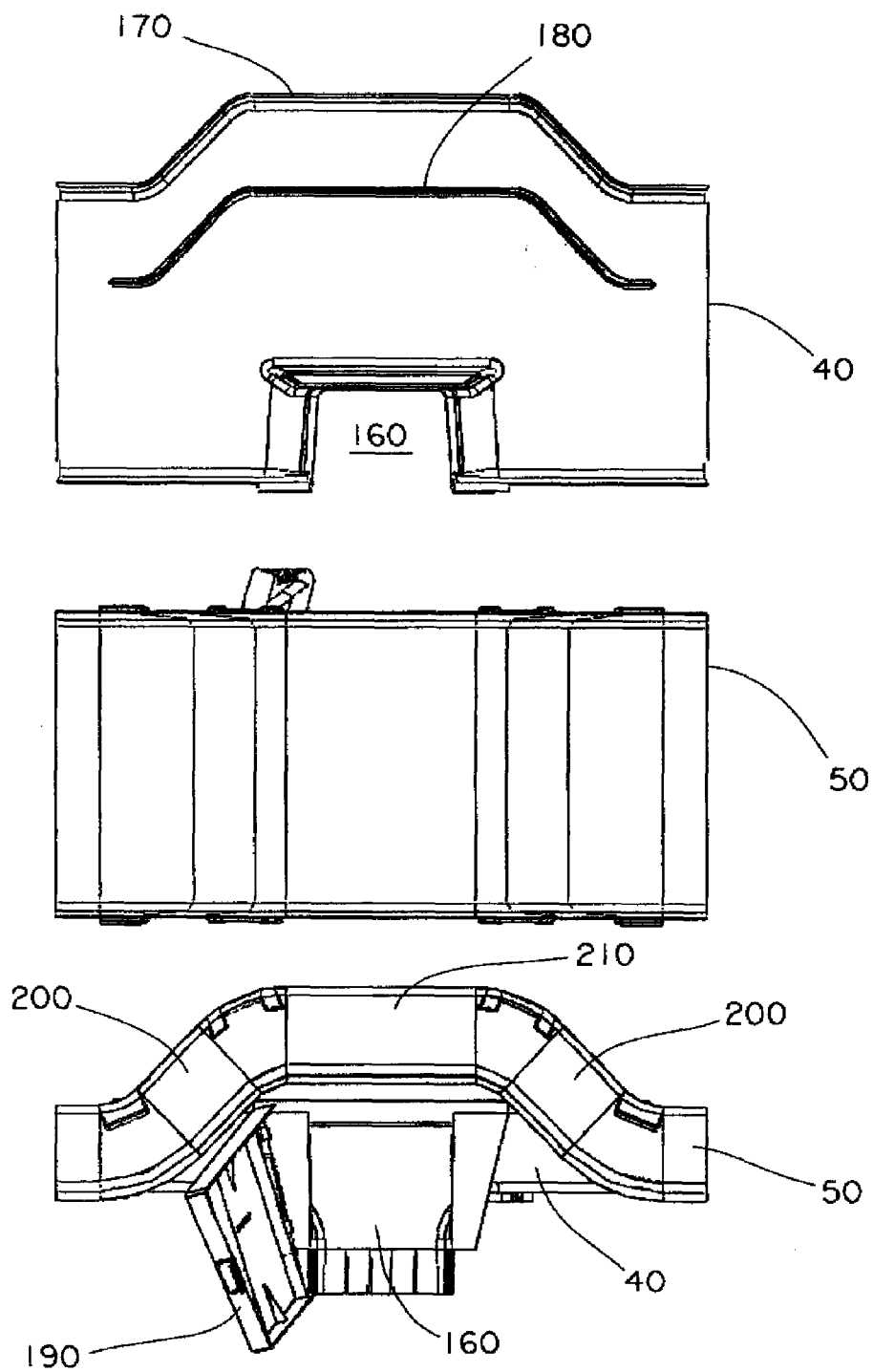
FIG. 11 depicts a top view of the example bump-up transition and the example bump-out vertical tee with the hinged door open.
Figure 12:
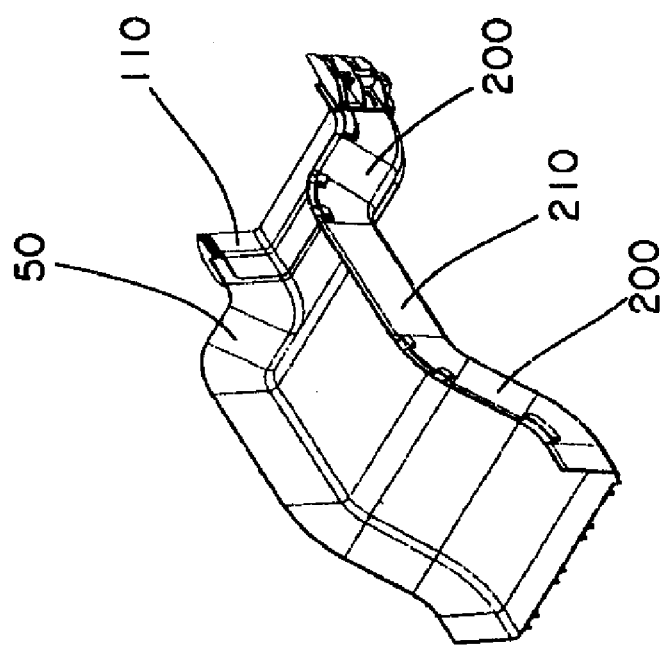
FIG. 12 depicts a top isometric view of the example bump-up transition connected to an embodiment of the coupler.

FIGS. 9-12 depict an embodiment of the blimp-up transition 50, FIG. 9 depicts a top isometric view of the example bump-up transition 50; FIG. 10*a* depicts a top view of the bump-up transition 50 and FIG. 10*b* depicts a cross-sectional view of the example bump-up transition 50; FIG. 11 depicts a top view of the example bump-up transition 50 and depicts how the example bump-up transition can allow access to the example bump-out vertical tee 40 shown in FIGS. 6-8; and FIG. 12 depicts a top isometric view of the example bump-up transition 50 connected to an embodiment of the coupler 110.

The bump-up transition 50 can increase the elevation of the cable routing to allow access to the access means 190 of the bump-out vertical tee 40. The bump-up transition 50 can include two sloped sections 200, which transition into a bump-up section 210. The sloped sections can include a particular bend radius, such as a two-inch bend radius as shown in FIG. 10b, which can help ensure the proper operation of fiber optic cable. As also shown in FIG. 10a, some embodiments of the bump-up transition 50 can have a length of 30 inches, and some embodiments can elevate the bump-up section 210 by 5.2 inches. Further, some embodiments of the bump-up transition 50 can have a width that corresponds to a 12-inch wide by 4-inch high cable routing path (and can thereby promote the modularity of the parallel path cable routing system 10). Other lengths and dimensions are possible as well.

FIG. 11 depicts a top view and front view of the bump-out vertical tee 40 and the bump-up transition 50 as employed in the parallel path cable routing system 10 shown in FIG. 1. In particular, FIG. 11 depicts the access means 190 (shown here as a hinged door) of the bump-out vertical tee 40 in the open position. The elevated bump-up section 210 of the bump-up transition 50 allows access to the access means 190 without interfering with the access means 190 (such as by allowing a hinged door to swing open and closed, for example).

As shown in FIG. 12, either side of the bump-up transition 50 can connect to a coupler 110, and thereby connect to other cable duct components. Such components can include the IFC pass-through component 30 and a section of the cable trough 20, as shown in FIG. 1, as well as other cable duct components. Some embodiments of the coupler 110 are 12-inches wide by 4-inches high, although other dimensions are possible as well.

5. Multi-Tier Vertical Transition (FIGS. 13-16)

Figure 13:
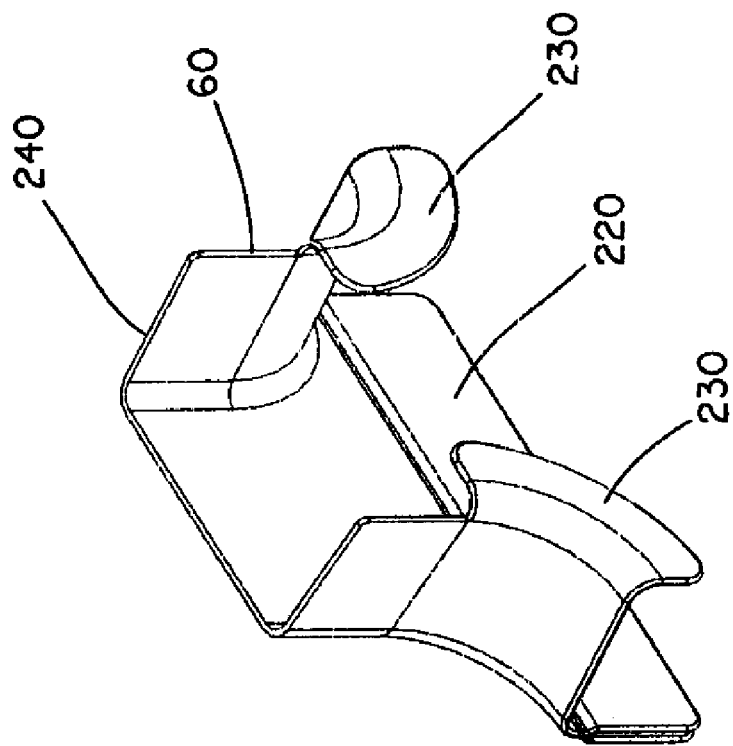
FIG. 13 depicts a top isometric view of an example multi-tier vertical transition.
Figure 16:
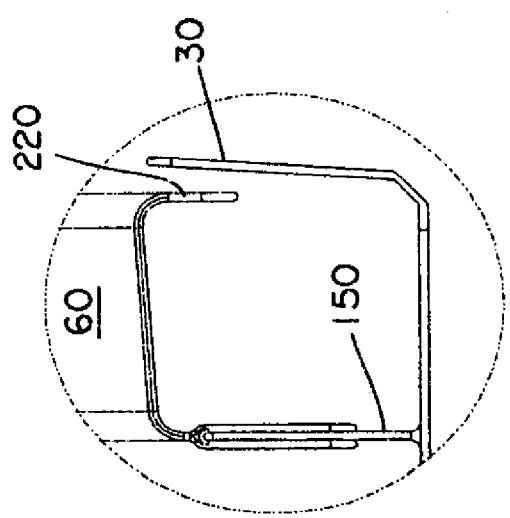
FIG. 16 depicts a detail side view of the example multi-tier vertical transition engaging the IFC pass-through component.

FIGS. 13-16 depict an embodiment of the multi-tier vertical transition 60. FIG. 13 depicts a top isometric view of the example multi-tier vertical transition 60; FIG. 14 depicts a top view and a cross-sectional view of the example multi-tier vertical transition 60; FIG. 15 depicts a top isometric view of the example multi-tier vertical transition 60 engaging the IFC pass-through component 30 shown in FIGS. 2-5; and FIG. 16 depicts a detail side view of the multi-tier vertical transition 60 engaging the IFC pass-through component 30.

The multi-tier vertical transition 60 can allow cable (such as fiber optic cable, for example) to be transitioned vertically from a first tier to a second or additional tier of the cable routing system, such as the additional tier 65 depicted in FIG. 1. Advantageously, embodiments of the multi-tier vertical transition 60 can provide cable to a second tier via a vertical transition that is straight above the first tier, thereby avoiding the need to route the cables outside of the width of the first tier.

As depicted in FIGS. 13 and 14, the multi-tier vertical transition 60 can include a containment wall 220, one or more curved sections 230, and a vertical opening 240 that can provide the vertical transition for cables as depicted in FIG. 1. Some embodiments of the opening 240 are 4 inches by 4 inches, and other embodiments are 6 inches by 4 inches, although other dimensions are possible as well. The curved sections 230 can include a particular bend radius (such as a two-inch bend radius as shown in FIG. 14) leading to the opening 240, which can help ensure the proper operation of fiber optic cable.

As depicted in FIG. 15, the multi-tier vertical transition 60 can attach to divider walls of other cable management system components, such as the divider wall 150 of the IFC pass-through component 30, for example. FIG. 16 depicts a detailed side cross-sectional view of the multi-tier vertical transition 60 and how some embodiments can attach to the divider wall 150 of the IFC pass-through component 30. The multi-tier vertical transition 60 can thus be positioned so that cables can be easily placed within the vertical opening 240 due to the space between the side wall of the IFC pass-through component 30 and a containment wall 220 of the multi-tier vertical transition 60.

As also depicted in FIG. 15, the multi-tier vertical transition 60 can connect to a coupler 110, and thereby connect to other cable duct components. Such components can include a section of cable duct 250 as shown in FIG. 15, as well as other cable duct components. Some embodiments of the coupler 110 are 4-inches wide by 4-inches high and some embodiments are 6-inches wide by 4-inches high, although other dimensions are possible as well.

6. Channel Cross-Over (FIGS. 17-19)

Figure 17:
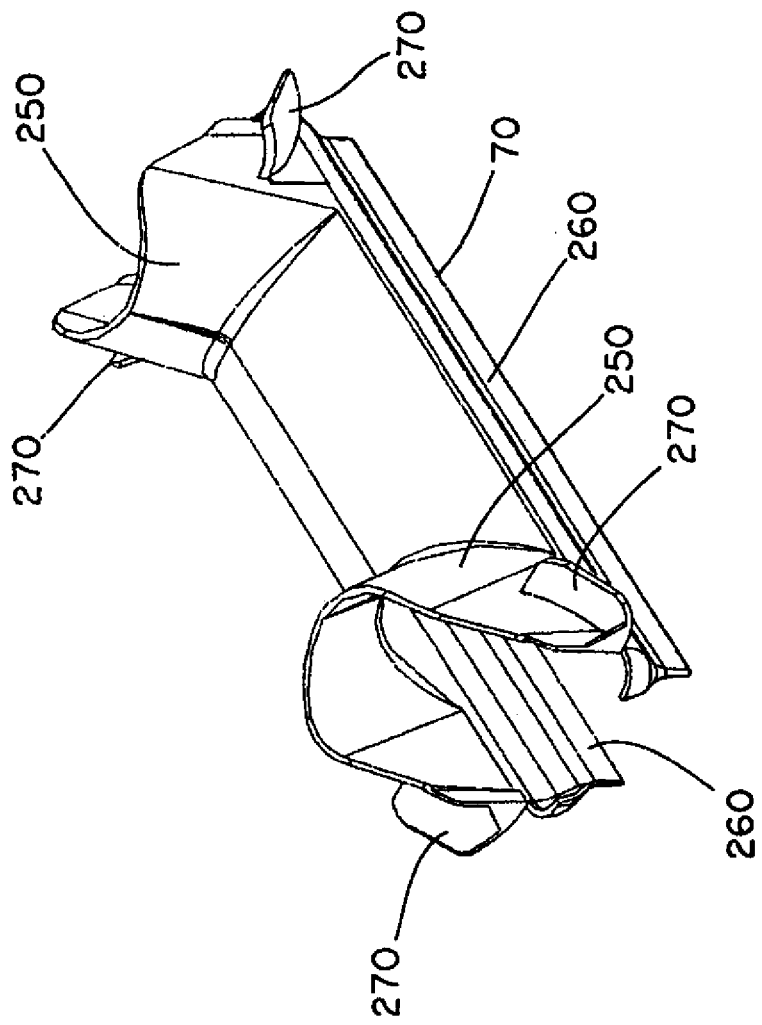
FIG. 17 depicts a top isometric view of an example channel cross-over.
Figure 18:
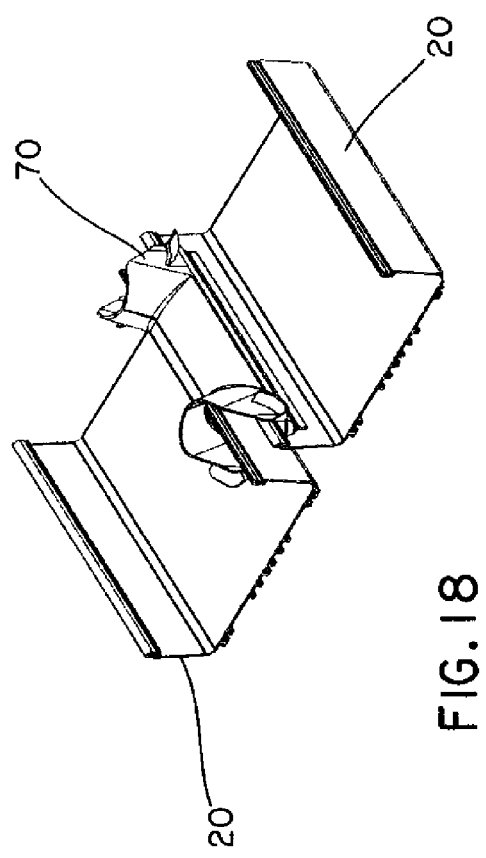
FIG. 18 depicts a top isometric view of the example channel cross-over engaging two sections of cable troughs.
Figure 19:
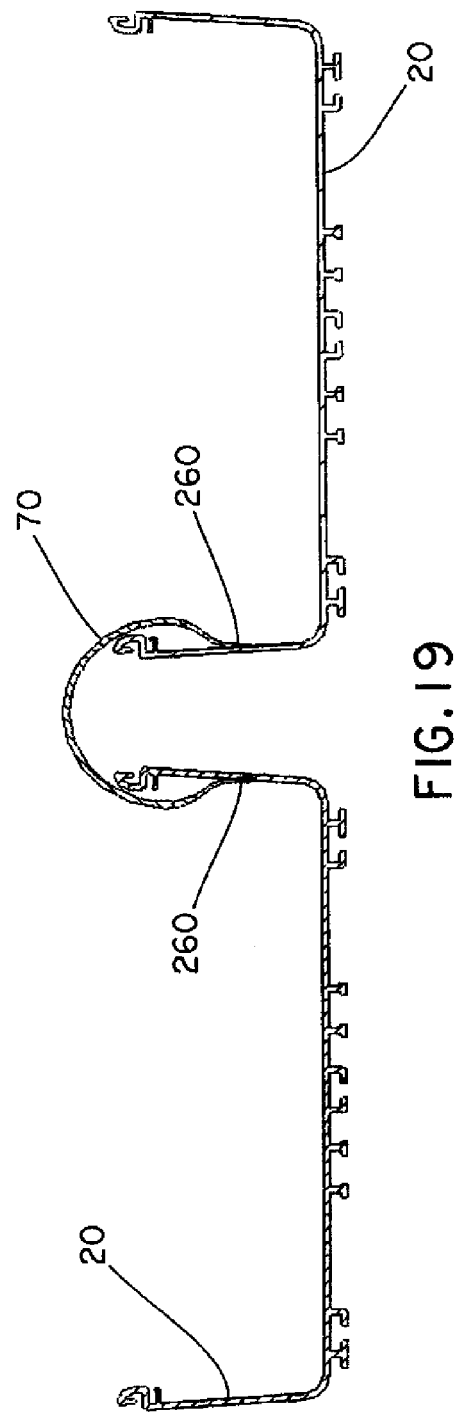
FIG. 19 depicts a cross-sectional view of the example channel cross-over engaging two sections of cable troughs.

FIGS. 17-19 depict an embodiment of the channel cross-over 70. FIG. 17 depicts a top isometric view of the example channel cross-over 70; FIG. 18 depicts a top isometric view of the example channel cross-over 70 engaging two sections of the cable troughs 20; and FIG. 19 depicts a cross-sectional view of the example channel cross-over 70 engaging two sections of the cable troughs 20.

The channel cross-over 70 can be used to transition cable (such as fiber optic cable, for example) from one parallel path cable routing system component to another parallel path cable routing system component. In some embodiments, the channel cross-over 70 can transition fiber optic cable from one section of the cable trough 20 to another section of the cable trough 20, as shown in FIGS. 1, 18, and 19.

The channel cross-over 70 comprises one or more bend radius control sections 250, two bottom rails 260, and one or more routing flaps 270. The one or more bend radius control sections 250 can provide a path through which cable can be routed over the channel cross-over 70 and can ensure that a particular bend radius (such as a two-inch bend radius as shown in FIGS. 17-19) is preserved when transitioning cable, which can help ensure the proper operation of fiber optic cable. The bottom rails 260 can engage or bear on the components between which the cross-over 70 transitions cable. The routing flaps 270 can help direct the cable being transitioned and can help maintain any bend radius control.

In some embodiments and as depicted in FIG. 19, the channel cross-over 70 can be held in place via tension. The two bottom rails 260 of the channel cross-over 70 can apply tension against the side walls of the components securing the fitting in place, such as sections of the cable trough 20. Advantageously, the use of tension to hold the channel cross-over 70 in place can allow for the installation of the channel cross-over 70 without tools, can allow for temporary installation of the channel cross-over 70, and can facilitate easy adjustments to the position of the channel cross-over 70. Other advantages are possible as well.

Some embodiments of the channel cross-over 70 can be used to transition cable between sections of the cable trough 20 that are 4-inches wide by 4-inches high, 6-inches wide by 4-inches high, or 12-inches wide by 4-inches high. Other examples and dimensions are possible as well.

7. Directional Fittings (FIGS. 20-27)

Figure 21:
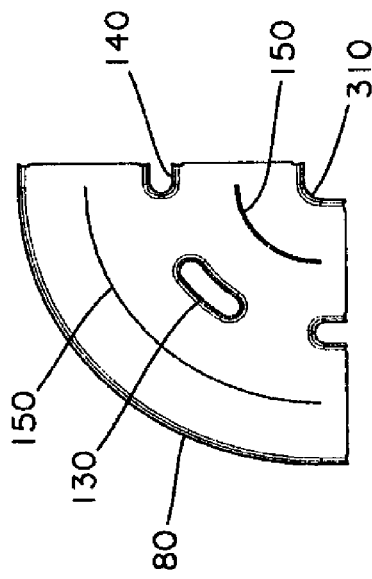
FIG. 21 depicts a top view of an embodiment of the dual right angle component.
Figure 23:
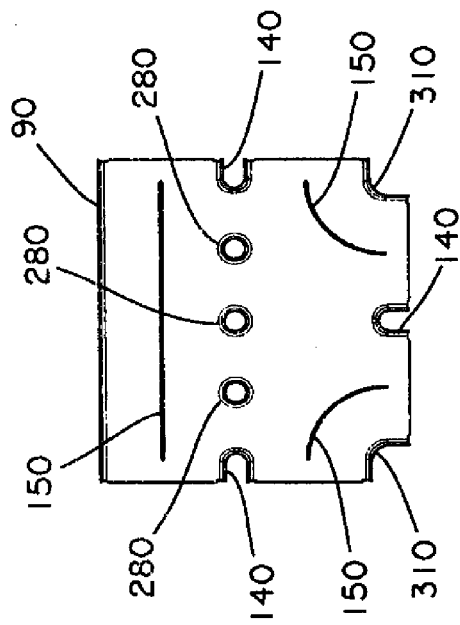
FIG. 23 depicts a top view of an embodiment of the dual horizontal tee.
Figure 20:
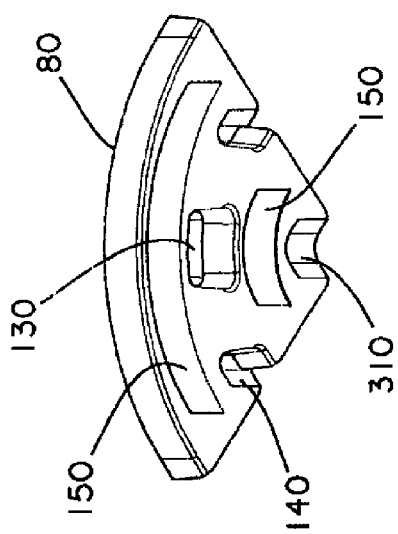
FIG. 20 depicts a top isometric view of an embodiment of a dual right angle component.
Figure 22:
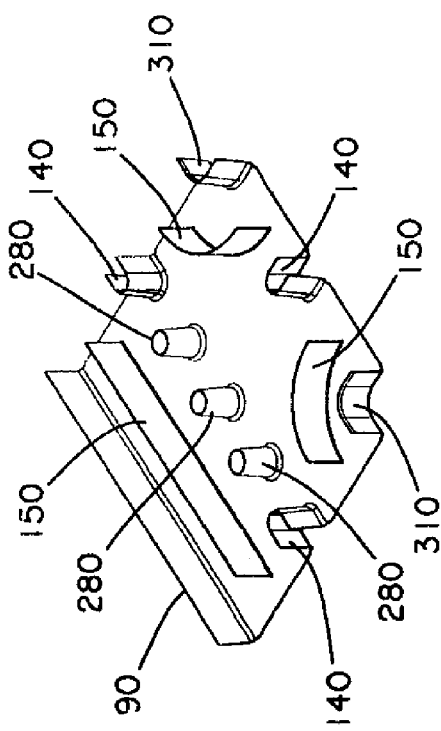
FIG. 22 depicts a top isometric view of an embodiment of a dual horizontal tee.
Figure 24:
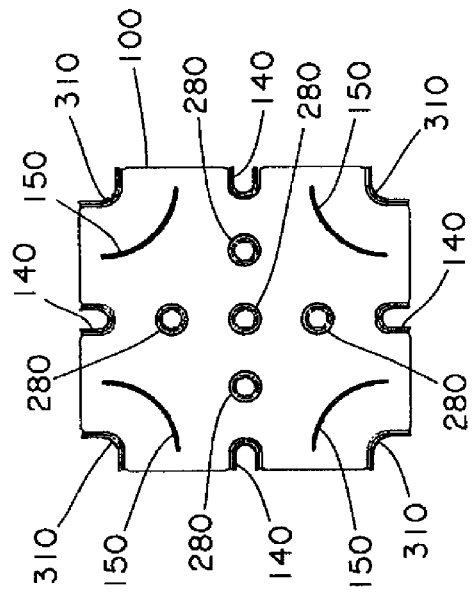
FIG. 24 depicts a top isometric view of an embodiment of a dual four way cross.
Figure 25:
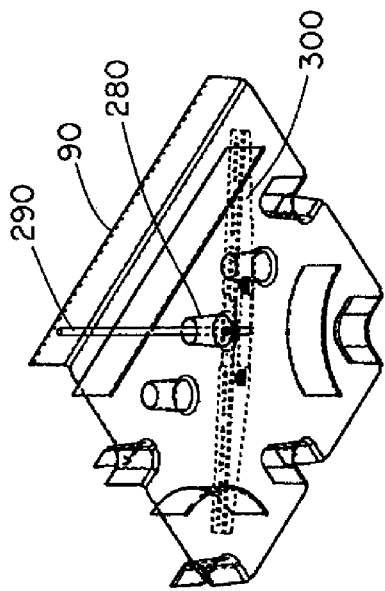
FIG. 25 depicts a top view of an embodiment of the dual four way cross.
Figure 26:
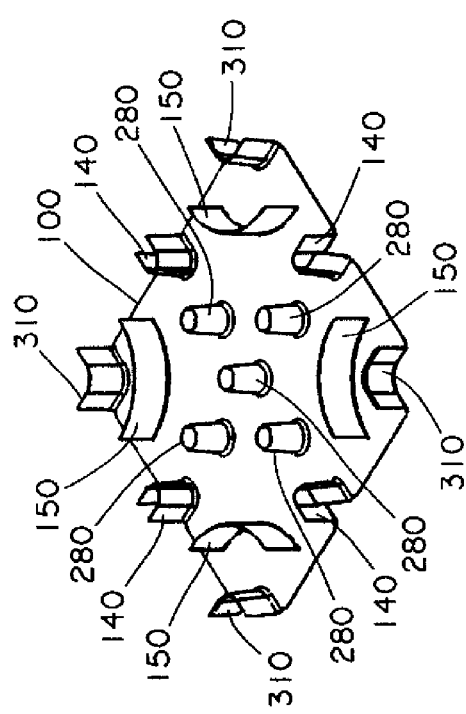
FIG. 26 depicts a top isometric view of the example dual horizontal tee connected to an embodiment of the coupler.
Figure 27:
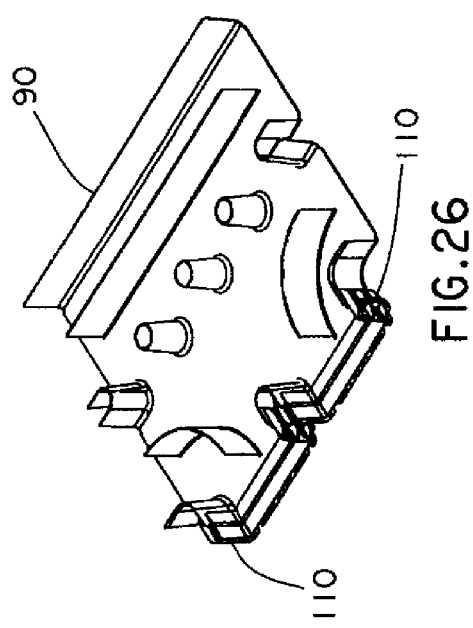
FIG. 27 depicts a top isometric view of the example dual horizontal tee being supported by a threaded rod and a dual cantilever bracket.

FIG. 20-27 depict three different directional fittings for the parallel path cable routing system 10 depicted in FIG. 1. FIGS. 20 and 21 depict a top isometric view and a top view, respectively, of an embodiment of the dual right angle component 80; FIGS. 22 and 23 depict a top isometric view and a top view, respectively, of an embodiment of the dual horizontal tee 90; FIGS. 24 and 25 depict a top isometric view and a top view, respectively, of an embodiment of the dual four way cross 100; FIG. 26 depicts a top isometric view of the example dual horizontal tee 90 connected to an embodiment of the coupler 110; and FIG. 27 depicts a top isometric view of the example dual horizontal tee 90 being supported by a threaded rod 290 and a dual cantilever bracket 300 (which can be seen in more detail in FIG. 33).

The dual right angle component 80, the dual horizontal tee 90, and the dual four way cross 100 can be used to change the direction of cable routing in a parallel path system, such as the parallel path cable routing system 10 as shown in FIG. 1. For example, the dual right angle component 80 can change the direction of cable routing by 90 degrees; the dual horizontal tee 90 can change the direction of cable routing by 90 degrees, as well as allow cable from two directions to pass straight through the tee 90 without changing direction; and the dual four way cross 100 can change the direction of cable routing by 90 degrees, as well as allow cable from four directions to pass straight through the cross 100 without changing direction. Further, some embodiments of the components 80, 90, and 100 can have a width that corresponds to parallel 12-inch wide by 4-inch high cable routing paths with the gap 25 (and can thereby promote the modularity of the parallel path cable routing system 10).

All three components 80, 90, and 100 may comprise one or more divider walls 150, one or more close-walled pass-thorough openings 130, one or more open-walled pass-through openings 140, and one or more hollow posts 280, or any combination of the four, all projecting upwards from the components. These items 150, 130, 140, and 280 can aid in cable management within each fitting by providing cable segregation and bend radius control protection. Each component 80, 90, and 100 may also include one or more bends 310, and each bend 310 can include a particular bend radius (such as a two-inch bend radius as shown in FIG. 23), which can help ensure the proper operation of fiber optic cable.

The one or more divider walls 150 can provide separation for cables routed directly through the fitting and can also provide a surface to which the multi-tier vertical transition 60 can attach, as shown in FIGS. 1 and 15 and as discussed in more detail above. The divider walls 150 can also help maintain bend radius control within the component.

The openings 130 and 140 (especially the opening 140) can allow for IFCs to pass through the component 80, 90, or 100 and smoothly transition into a distribution frame, such as the distribution frame 120 depicted in FIG. 1. In one embodiment, the parallel path cable routing system 10 can be located directly above the distribution frame 120, and such an arrangement can conserve space within a facility. The openings 130 and 140 can also function to space out and separate the parallel routes of cable. The one or more open-walled pass-thorough openings 140 can form a close-walled pass-through opening or a gap, for example, depending on whether or if the component 80, 90, or 100 is connected to another cable routing component, cable troughs etc.

The hollow posts and openings 280, 130 and 140 can also provide a means through which to pass a section of threaded rod 290 to support a bracket, such as a dual cantilever bracket 300, for example, on the underside of the component 80, 90, or 100 as depicted in FIG. 27. (The dual cantilever bracket 300 can be seen in more detail in FIG. 33.) Other means of support are possible as well. Moreover, the openings 130 and 140 and the hollow posts 280 can provide slack control by allowing excess cable to be wrapped around these items while maintaining bend radius control.

As shown in FIG. 26, any of the components 80, 90, or 100 can connect in multiple places to embodiments of the coupler 10, and thereby connect to other cable duct components. Such components can include the IFC pass-through component 30 and sections of the cable trough 20, as shown in FIG. 1 as well as other cable duct components and cable troughs. Some coupler embodiments are 12-inches wide by 4-inches high, although other dimensions are possible as well.

8. Deployment of the Parallel Path Cable Rotating System (FIGS. 28-33)

Figure 28:
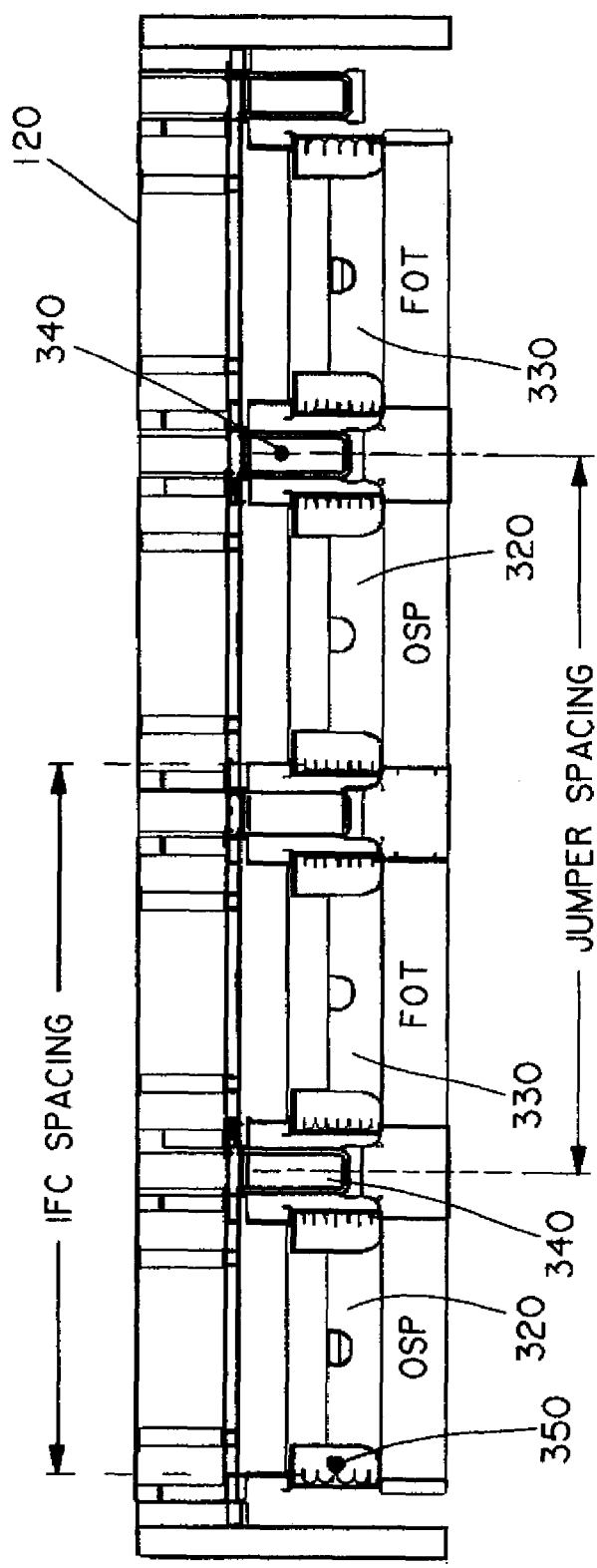
FIG. 28 depicts a top view of a distribution frame.
Figure 29:
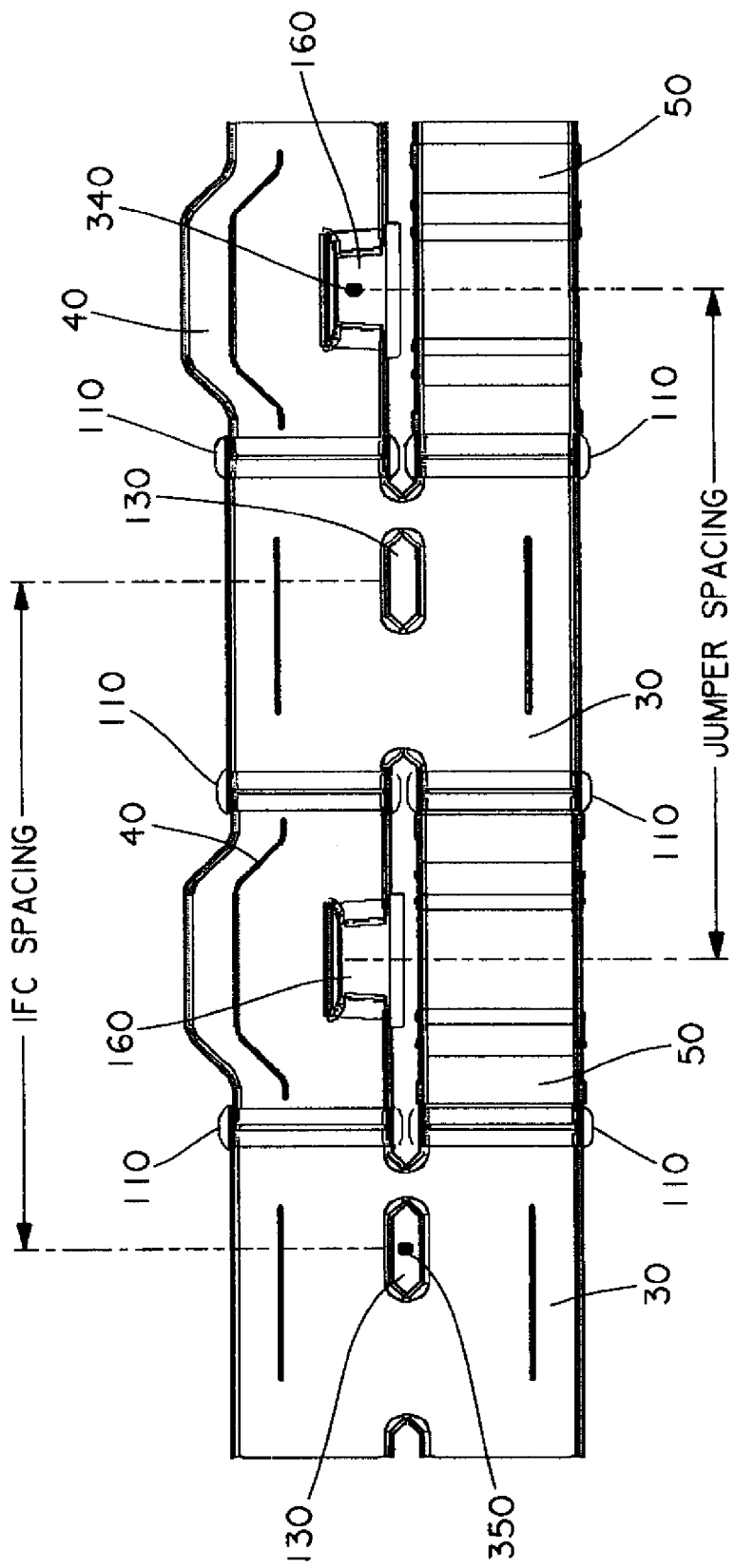
FIG. 29 depicts a top view of one embodiment of a parallel path cable routing system as it might be configured over the distribution frame.

FIGS. 28-33 depict an example deployment of the parallel path cable routing system 10 over the four-bay high-density distribution frame 120. FIG. 28 depicts a top view of the distribution frame 120; FIG. 29 depicts a top view of one embodiment of the parallel path cantilever bracket 300.

FIG. 28 depicts one embodiment of the four-bay high-density distribution frame 120. The distribution frame 120 can include one or more outside plant ("OSP") bays 320 and one or more fiber optic termination ("FOT") bays 330, which can help terminate and/or distribute cable such as fiber optic cable, for example. As shown in FIG. 28, the example distribution frame 120 can have a depth of 24 inches. Other configurations, bays, and dimensions are possible as well.

FIG. 28 also depicts an example of the locations where jumpers 340 enter or exit the distribution frame 120 and the locations where IFCs 350 enter the distribution frame 120. The example jumper 340 locations can be centrally located across the 24" depth of the frame. The example IFC 350 drops can be positioned slightly towards the back of the frame 120. In some embodiments, the IFCs 350 and the jumpers 340 alternate every other frame (OSP/FOT). As shown in FIG. 28, the IFCs 350 can be spaced 60 inches apart, and the jumpers 340 can also be spaced 60 inches apart.

FIG. 29 depicts an example configuration of several components of the parallel path cable routing system 10 that can be located over the four-bay high-density distribution frame 120. In particular, two IFC pass-through components 30, two bump-out vertical tees 40, and two bump-up transitions 50 have been arranged to be located over the distribution frame 120 depicted in FIG. 28. The components of the cable routing system 10 can be joined via duct couplers 110.

In the example configuration depicted in FIGS. 28-31, the IFC pass-through components 30, the bump-out vertical tees 40, and the bump-up transitions 50 each have a length of 30 inches to correspond with the length of the distribution frame 120, which can comply with the Generation III Frame dimensions referenced in the Generic Requirements and Design Considerations for Fiber Distributing Frames standard by Telcordia Technologies (Doc. No. GR-449; Issue No. 2; July 2003) (which is incorporated herein by reference as if set forth here in full). Further, the 60-inch jumper spacing can correspond to a 60-inch spacing of the vertical drop openings 160 of the two bump-out vertical tees 40 depicted in FIG. 29. The location of the jumpers 340 can also correspond with the location of the vertical drop openings 160 along the width of the two bump-out vertical tees 40. Similarly, the 60-inch IFC spacing can correspond to a 60-inch spacing of the close-walled pass-through openings 130 of the two IFC pass-through components 30 depicted in FIG. 29. The location of the IFCs 350 can also correspond with the location of the close-walled pass-through openings 130 along the width of the two IFC pass-through components 30. Moreover, the 30-inch spacing of the components 30, 40, and 50 allow the 60-inch jumper spacing and the 60-inch IFC spacing to be maintained. Other configurations are possible as well.

Figure 30:
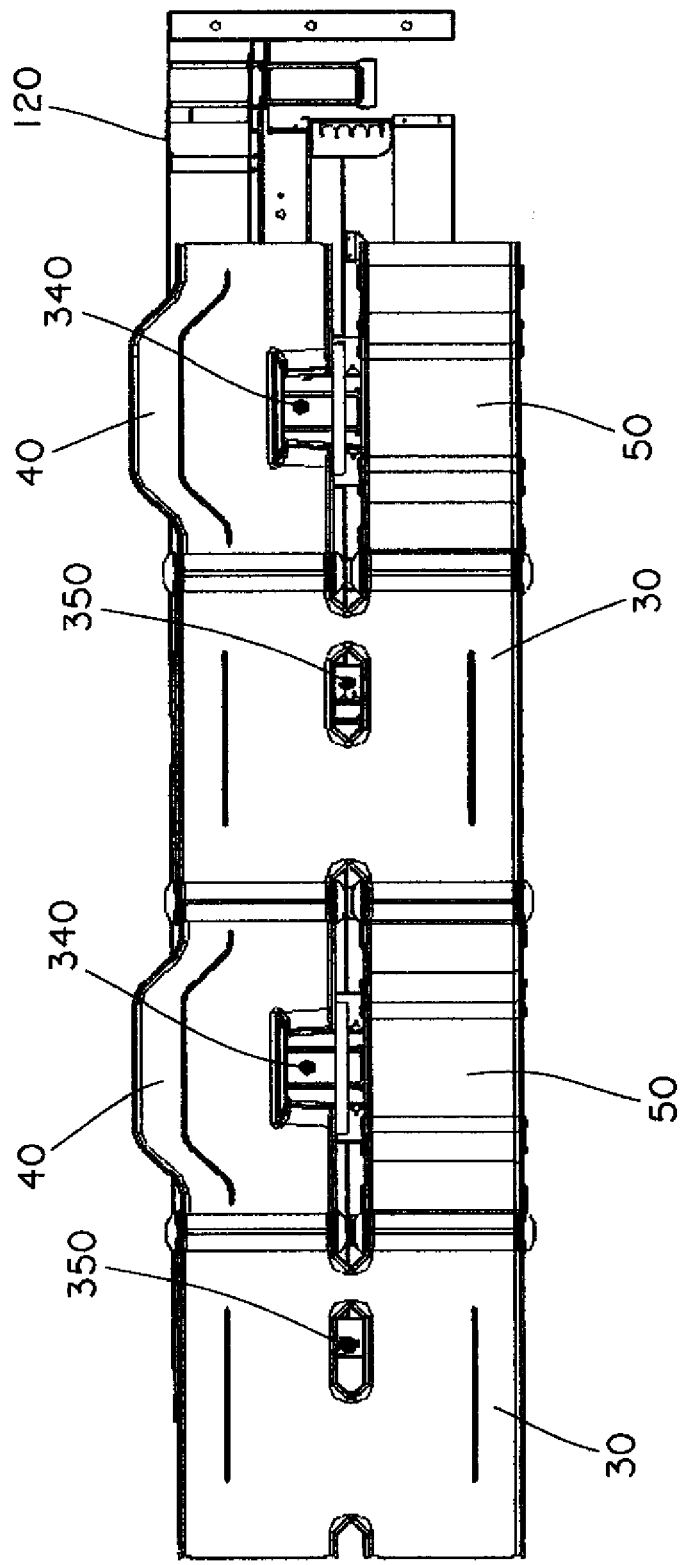
FIG. 30 depicts a top view of the same embodiment of the parallel path cable routing system over the distribution frame.
Figure 31:
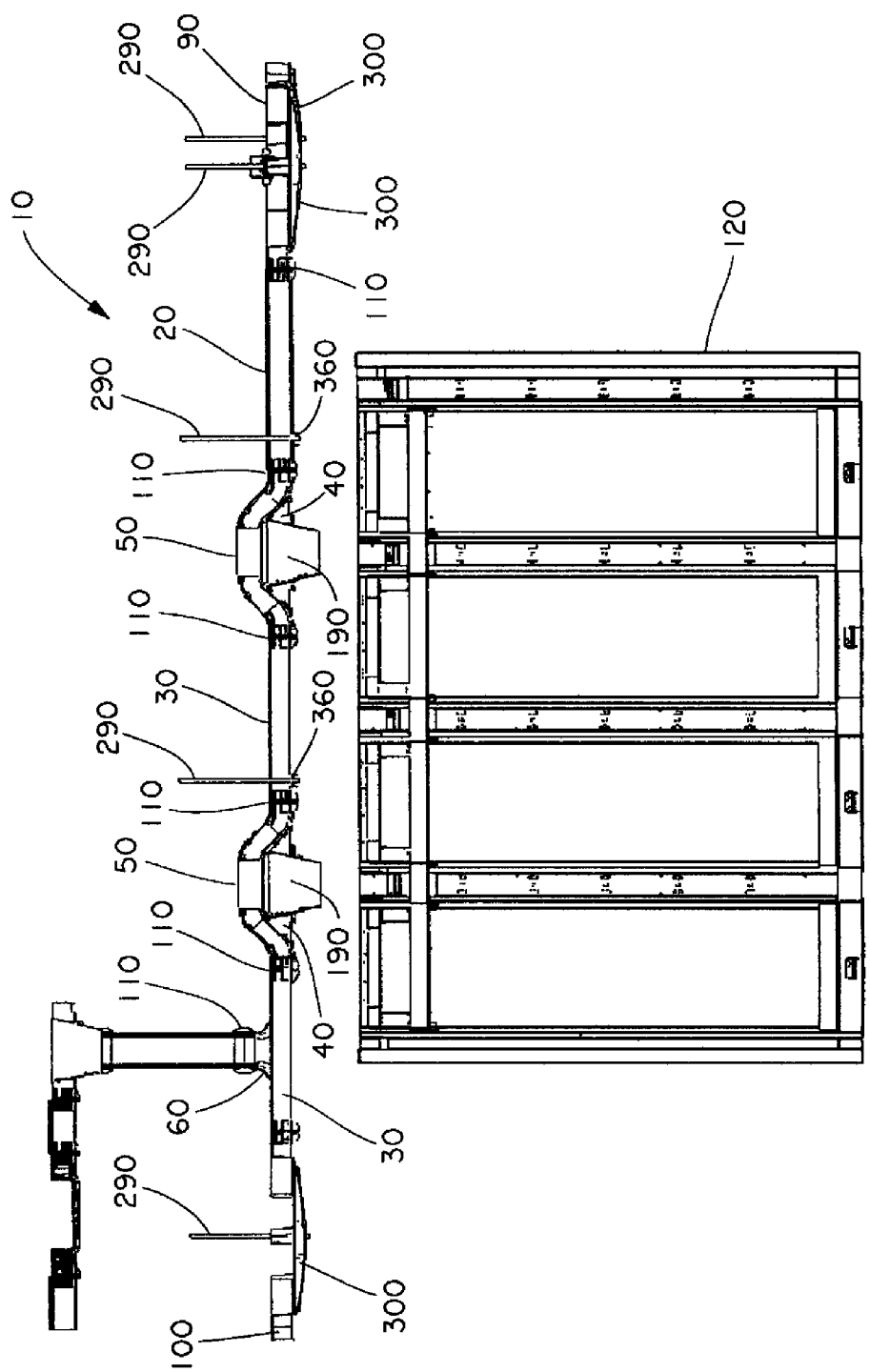
FIG. 31 depicts a rear view of the same embodiment of the cable routing system over the distribution frame.

FIG. 30 depicts a top view of one embodiment of the parallel path cable routing system 10 over the four-bay high-density distribution frame 120, and FIG. 31 depicts the view of the same configuration if one were Looking at the back of the distribution frame 120. As can be seen in FIG. 31, the bump-up transition 50 allows a user to access the access means 190 (which can be a hinged door, for example) of the bump-out vertical tee 40, thereby providing clear access to the jumpers 340 being routed through the bump-out vertical tee 40.

FIG. 31 also depicts a plurality of threaded rods 290, which can engage, for example, a bracket such as the trapeze bracket 360 or the dual cantilever bracket 300. The threaded rod supports can thereby provide support for the various components of the parallel path cable routing system 10. Advantageously, such supports can minimize interference with the cable system components and the routing of the cable. Moreover, the system components can be fabricated to facilitate use of a threaded rod support, such as by incorporating hollow posts 280 and/or openings 130 and 140, as shown in FIGS. 20-27, for example, which can receive the threaded rods 290. Further, such supports can occupy a minimum amount of space in the facility that houses the parallel path cable routing system 10. Other supports and configuration is are possible as well.

Figure 32:
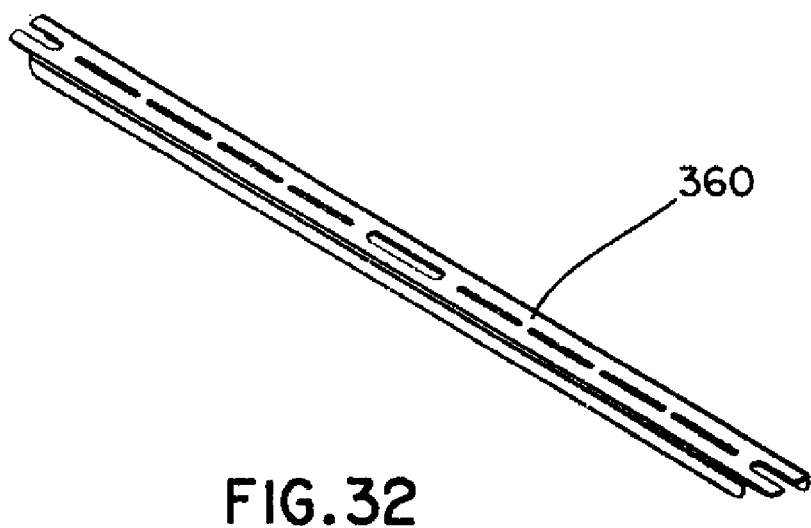
FIG. 32 depicts a top isometric view of an example trapeze bracket.
Figure 33:
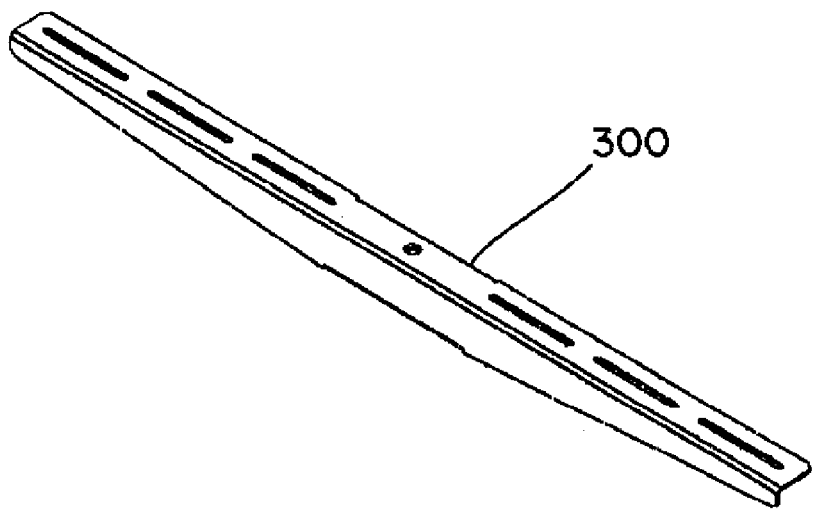
FIG. 33 depicts a top isometric view of an example dual cantilever bracket.

FIGS. 32 and 33 depict an example of the trapeze bracket 360 and an example of the dual cantilever bracket 300. Other examples of these and other brackets can also be incorporated into the parallel path cable routing system 10.

9. Conclusion

Several examples of particular embodiments of the present invention have been described above. Those skilled in the art will understand, however, that changes and modifications may be made to these embodiments without departing from the true scope and spirit of the present invention, which is defined by the claims.

The invention claimed is:

1. A cable routing system, the system comprising:
   a first cable trough, the first cable trough having a first end, a second end and a first channel extending therebetween, wherein the first channel defining the a first plane;
   a second cable trough parallel to the first cable trough, the second cable trough having a first end, a second end and a second channel extending therebetween, wherein the second channel defining a second plane parallel to the first plane;
   a gap between the first cable trough and the second cable trough, wherein the gap extends from the first end of the first and second cable troughs to the second end of the first and second cable troughs; and
   a cross-over component for transitioning cables from one of the first or second cable trough to the other of the first and second cable trough, wherein the cross-over component is positioned above the first cable trough and above the second cable trough so as to extend from the first plane to the second plane.

2. The cable routing system of claim 1, wherein the cross-over component is positioned between the first and second ends of the first and second cable troughs.

3. The cable muting system of claim 1, wherein the cross-over component includes one or more bend radius control points and muting flaps for directing cable and maintaining bend radius control.

4. The cable routing system of claim 1, wherein the cross-over component includes bottom rails for engaging the first and second cable troughs to secure the cross-over component to the first and second cable troughs.

5. The cable routing system of claim 1, further comprising a cable routing component wherein the cable muting component includes a pass through opening, whereby the pass through opening engages the gap when the cable muting component is secured to the first and second cable troughs.

6. The cable muting system of claim 1, further comprising a pass-through component having at least one opening for transitioning cable into a distribution frame.

7. The cable routing system of claim 1, further comprising a pass-through component having divider walls for separating cables routed directly through the pass-through component.

8. The cable routing system of claim 1, further comprising:
   a vertical tee component connected to the first cable trough, the vertical tee comprising an opening to allow one or more cables to extend down from the cable routing system; and
   a bump-up transition component connected to the second cable trough, the bump-up transition component comprising an elevated bump-up section that raises the elevation of the cable muting system to allow access to the vertical tee component.

9. The cable routing system of claim 1, wherein one of the first and second cable troughs comprises a substantially planar surface, a side wall and a divider wall extending from the substantially planar surface; and
   a vertical transition component, the vertical transition component engaging the side wall and the divider wall of one of the first and second cable troughs, wherein the vertical transition component allows one or more cables to extend up from one of the first and second cable troughs to a second tier for cable routing.

* * * * *

UNITED STATES PATENT AND TRADEMARK OFFICE
CERTIFICATE OF CORRECTION

| | | |
|---|---|---|
| PATENT NO. | : 7,693,386 B2 | |
| APPLICATION NO. | : 11/421346 | |
| DATED | : April 6, 2010 | |
| INVENTOR(S) | : Dennis J. Waszak | |

It is certified that error appears in the above-identified patent and that said Letters Patent is hereby corrected as shown below:

Title Page; item (56);
Page 2, References Cited: "6,708,918 B2 3/2004 Watts, et al." should read "6,708,918 B2 3/2004 Ferris, et al.".

Column 1, line 54 which reads "4-inch high, 6-inch wide by 4-inch high. and 12-inch wide by" should read "4-inch high, 6-inch wide by 4-inch high and 12-inch wide by".

Column 11, line 4 which reads "of the same configuration if one were Looking at the back of" should read "of the same configuration if one were looking at the back of".

Column 11, line 24 which reads "system 10. Other supports and configuration is are possible as" should read "system 10. Other supports and configuration are possible as".

Column 12, line 10 which reads "The cable muting system of claim 1, wherein the cross-" should read "the cable routing system of claim 1, wherein the cross-".

Column 12, line 12 which reads "points and muting flaps for directing cable and maintaining" should read "points and routing flaps for directing cable and maintaining".

Column 12, line 19 which reads "a cable routing component wherein the cable muting compo-" should read "a cable routing component wherein the cable routing compo-".

Column 12, line 21 which reads "through opening engages the gap when the cable muting" should read "through opening engages the gap when the cable routing".

Column 12, line 23 which reads "The cable muting system of claim 1, further comprising" should read "The cable routing system of claim 1, further comprising".

Signed and Sealed this
Second Day of August, 2011

David J. Kappos
*Director of the United States Patent and Trademark Office*